SHELBY FULLEN.

Improvement in Straw Stackers.

No. 124,564.                  Patented March 12, 1872.

S. Fullen
INVENTOR.
By Knight Bros.
Attys.

Attest.
Jas. H. Layman.
John Kiloh.

UNITED STATES PATENT OFFICE.

SHELBY FULLEN, OF FRANKLIN, INDIANA.

IMPROVEMENT IN STRAW-STACKERS.

Specification forming part of Letters Patent No. 124,564, dated March 12, 1872.

I, SHELBY FULLEN, of Franklin, Johnson county, Indiana, have invented a new and useful Straw-Stacker, of which the following is a specification:

This is a device for elevating straw for the purpose of stacking; and consists of a rake or series of rakes, which project from the upper extremity of a shaft, which is journaled in a leaning position in a suitable base or frame, that rests upon the ground.

Figure 1:
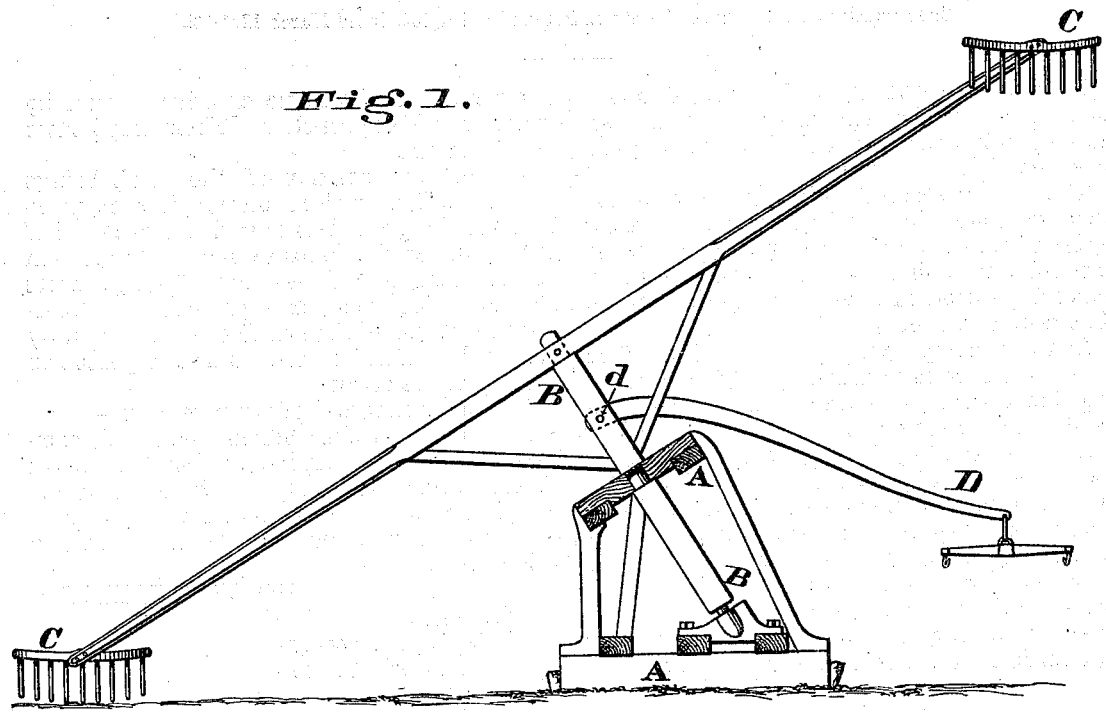
Figure 2:
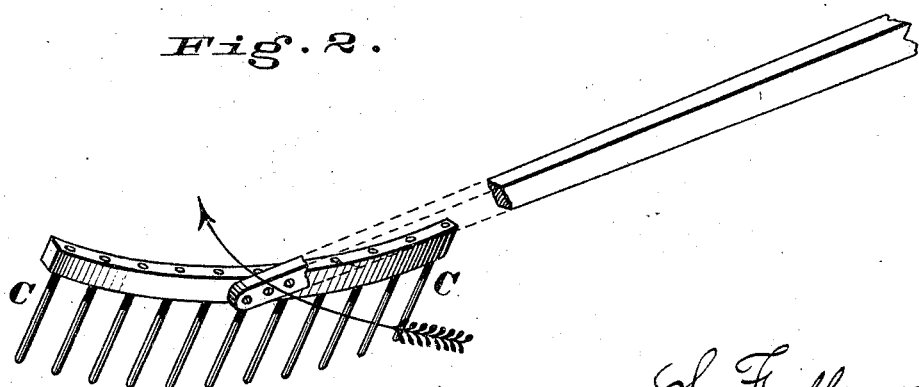

In the accompanying drawing, Figure 1 is an elevation of my stacker, partly in section. Fig. 2 is a perspective view of one of the rake-heads on a larger scale.

A is the stand or frame, designed, when in use, to rest solidly upon the ground or floor, but which may be elevated on suitable wheels or casters, when desired, for removal. Within the frame A is journaled a shaft or pole, B, in a leaning position, as represented, and armed with one or more rakes, C. A sweep or lever, D, hinged or pivoted (d) to the shaft B, affords a means of hitching to the revolving rake B C the horse or other animal by which it is to be propelled. There may be two of such levers.

The leaning position of the shaft brings each rake, C, at each revolution, in such proximity to the ground as to gather a rake full of straw, and at the opposite half of its rotation at such position and elevation as to deposit its load upon the stack, or to present the gathering in such position as enables it to be readily removed by a fork in the hands of a person on the top of the stack.

I claim as new and of my invention—

The straw-stacker herein described, composed of the stand A, inclined shaft B, rakes C, and hinged lever D, the whole being arranged and adapted to operate as set forth.

In testimony of which invention I hereunto set my hand.

SHELBY FULLEN.

Witnesses:
   GEO. H. KNIGHT,
   JOHN W. WILSON.